Aug. 2, 1960     J. M. WALTER     2,947,226
TOOL LIFT MECHANISM
Filed Feb. 27, 1958     3 Sheets-Sheet 3
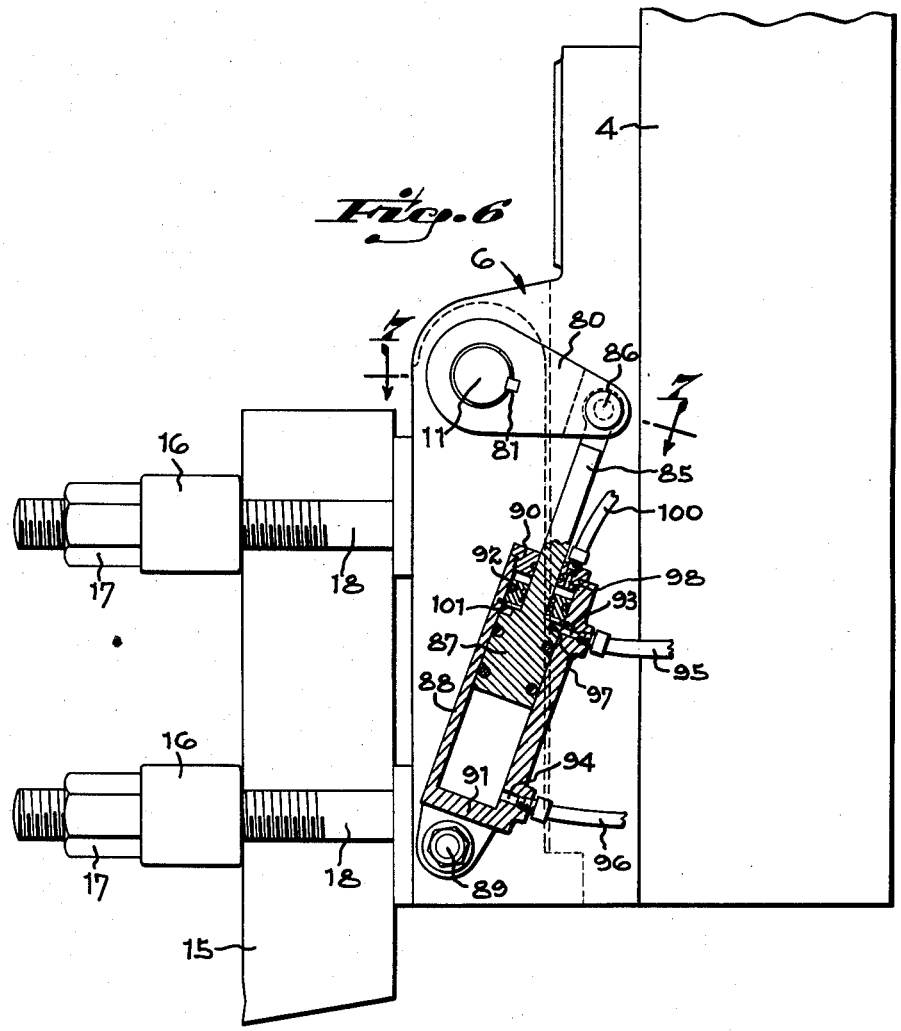
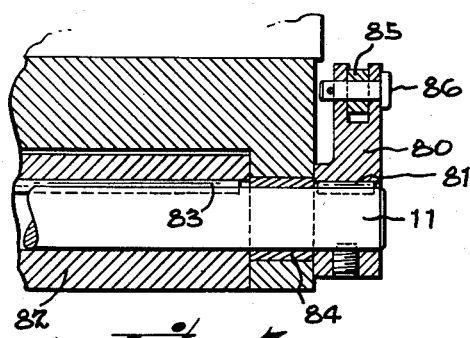
INVENTOR.
John M. Walter.
BY Wood, Herron & Evans.
ATTORNEYS.

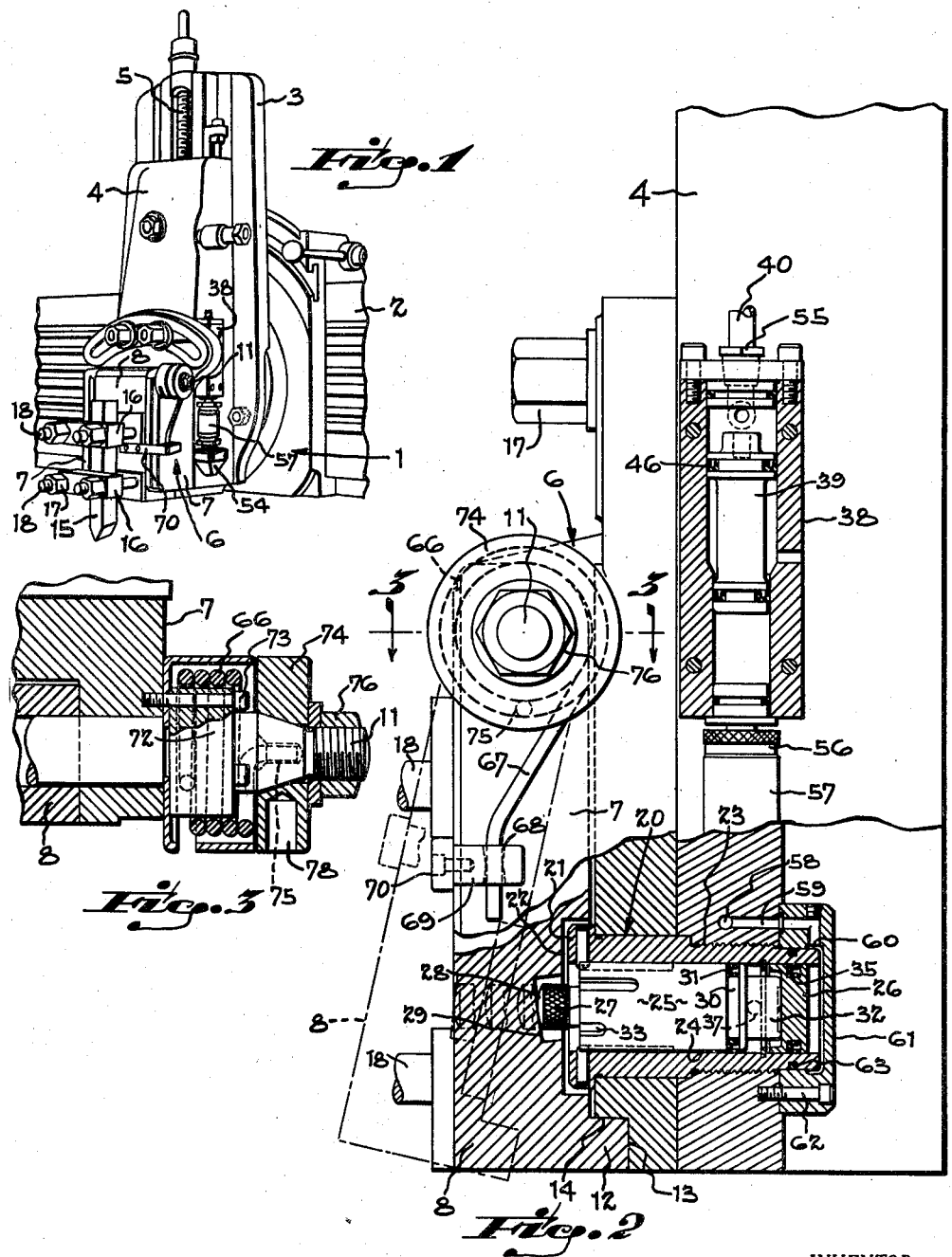

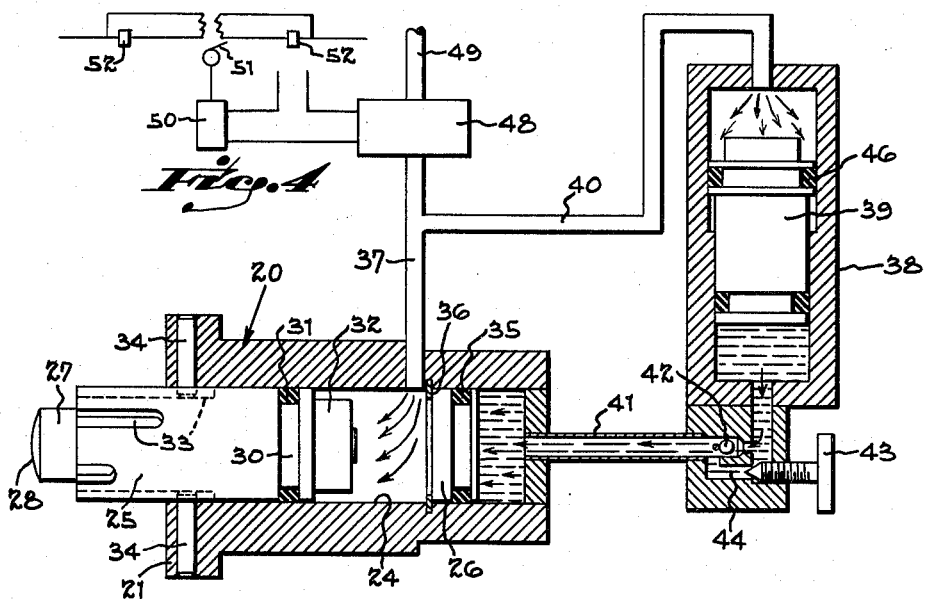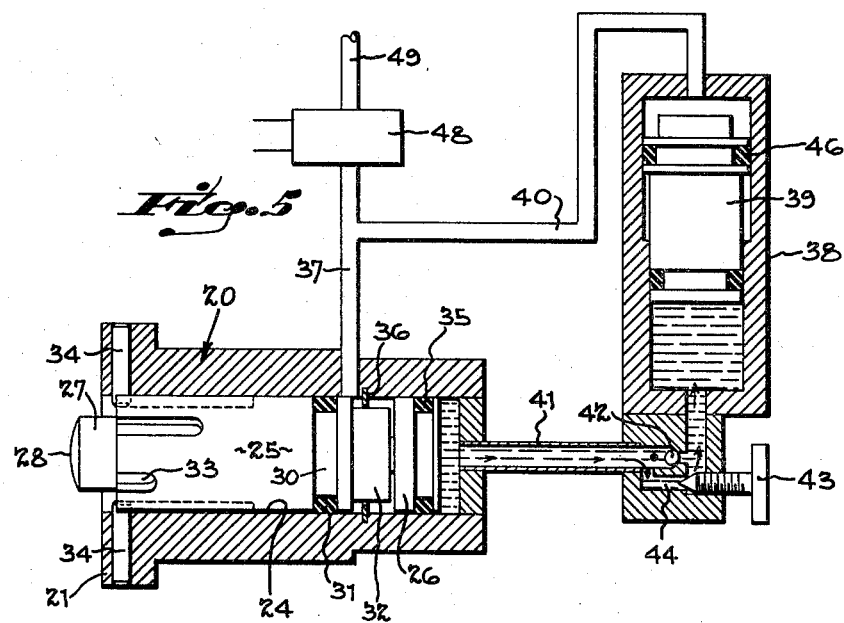

United States Patent Office 2,947,226
Patented Aug. 2, 1960

2,947,226
TOOL LIFT MECHANISM

John M. Walter, Cincinnati, Ohio, assignor to The G. A. Gray Company, Cincinnati, Ohio, a corporation of Ohio Filed Feb. 27, 1958, Ser. No. 718,068

6 Claims. (Cl. 90—55)

This invention relates to machine tools and is directed particularly to metal working planers of the type wherein a table reciprocable upon a base carries the work piece through successive cutting strokes past a tool which is stationary during the cutting stroke but which is fed to a new position before each cutting stroke, thereby progressively planing a surface on the work piece.

In the conventional planer, after each stroke of the work past the tool in the cutting direction, the tool is elevated so that its cutting edge clears the work piece during return movement of the table, and the tool is then lowered to its cutting position and fed prior to commencement of the next cutting stroke. This arrangement is employed to avoid the drag and wear upon the cutting edge of the tool which would occur during return movement of the work piece if the tool were allowed to remain in position adjacent the surface which it had just generated by its cutting action. Thus, the clearance angle to which a tool is ground for proper cutting action defines a wedge-shaped area between the work piece, the cutting edge, and the heel of the tool, into which chips lying on the work piece would become wedged during return movement and thereby nick or abraid the tool edge if it were not lifted. Tools having cemented carbide tips of the type necessary for high-speed cutting in modern practice are particularly susceptible to chip damage of this type, despite their unusual durability in withstanding the heat and abrasion to which they are subjected during the actual cutting stroke. Also, when cuts of substantial depth are being taken upon some types of metal such as steel, chips of substantial size are produced, for which reason it is requisite that the tool be elevated a substantial distance above the work piece during return strokes of the table; although in other instances, as when a thin finishing cut is being taken upon a metal such as cast iron, the chips are so small that the tool need be elevated only a slight distance to obtain the necessary clearance.

In the operation of a planer, it is apparent that lifting of the tool to an elevated position cannot commence until the end of the work piece has been carried past the tool at the end of the cutting stroke and that lowering of the tool cannot commence until the end of the work piece has been carried past the tool on the return stroke. This means that each end of the work piece must be carried past the tool through a distance at least sufficient to allow the tool-elevating or tool-lowering function to be completed. During these periods of over-travel, of course, no useful work is being performed upon the work pieces, and the time devoted thereto is wasted. On the other hand, it is not unusual for planers of modern design to be operated at cutting speeds as high as 300 feet per minute and return stroke speeds as high as 600 feet per minute. From this it is apparent that substantial over-travel distance, e.g., as much as 1½ to 2½ feet, must be provided at each end of each stroke to furnish the time necessary for completion of the tool-lifting and tool-lowering steps in the sequence of operation. The required length of over-travel is independent of the length of the work piece; hence, where the work piece is relatively short, the time devoted to over-travel assumes an undesirably large relation to the time during which actual cutting takes place.

In the conventional planer, the cutting tool is mounted rigidly upon an apron, sometimes called a clapper block, which is pivoted to swing upwardly away from the work piece to its elevated position, and an automatically operable lifter is provided to raise the tool to elevated position. In some instances mechanically operated tool lifters are employed, in other instances the lifters are operated pneumatically, but in either instance the tool block returns by gravity to its cutting position. Mechanically operable lifters have been found to be too sluggish to perform the intended lifting and lowering functions within the limited period of time that is available if excessive over-travel of the table is to be avoided.

Moreover, the associated elements which are to be lifted, comprising the apron or tool block, the tool, and the clamping means for holding the tool in position on the block, constitute a heavy unit and therefore possesses substantial momentum. If air in a pneumatic lifting system is applied at a pressure adequate to lift the unit in a rapid manner, the action is too brisk, that is, in coming to rest at its upper limit of swing the tool block exerts a heavy jolt to the tool head and supporting cross rail. Repeated jolting of the machine in successive strokes causes the rail elevating screws or the independently adjustable elevating screw in the tool head to creep by small increments from the adjusted position in which they have been carefully set at the beginning of a planing operation; the action occurs, though to a lesser degree, even when the parts are clamped together. Errors introduced through such creepage, which at each stroke may be only a fraction of a thousandths of an inch, is cumulative in repeated strokes and becomes intolerable where good accuracy is required. In order to avoid the errors caused by such repeated jolting, it is necessary to reduce the air pressure employed for tool lifting, in which event the pneumatic type of system is as sluggish as, and therefore offers no advantage over, the mechanical type of tool lifter.

The principal objective of this invention has been to provide a tool lift mechanism for a metal working planer wherein very prompt tool lifting and seating actions are accomplished, whereby over-travel of the table beyond the length of the work piece at the end of the cutting stroke is minimized.

A further objective of this invention has been to provide a tool lift mechanism for a metal planer wherein very prompt or rapid tool lifting and tool lowering actions are accomplished without bouncing of the tool as it comes to rest either in its raised or lowered position whereby jolting of the machine is eliminated and the accuracy of tool setting is perserved.

Another objective of this invention has been to provide a tool lifting mechanism which includes means for returning the tool to cutting position in a very rapid manner at the end of a return stroke without bumping the tool against its stop or jarring the tool sufficiently to introduce creep errors in tool setting.

A more specific objective of the invention has been to provide a fast-acting tool lift mechanism wherein movement of the tool from lift position to cutting position is accompanied by absorption of the shock which would otherwise occur through high-speed engagement of the tool with the rigid rest against which it is supported during cutting.

Other objectives and further advantages of the present invention are disclosed in relation to the following detailed description of the drawings in which:

Figure 1 is a perspective view showing a tool head and associated parts of a planer wherein the lift mechanism of the present invention is embodied;

Figure 2 is a side elevation of the tool lifter, partly broken away to show the lifting mechanism;

Figure 3 is a cross-sectional view taken on the line 3—3 of Figure 2;

Figure 4 is a diagrammatic view illustrating the principal elements of the tool lifting system shown in Figure 2; in Figure 3 the parts are shown during the lifting operation;

Figure 5 is a diagrammatic view similar to Figure 3 but illustrating the parts in the phase of operation wherein the tool is coming to rest in its lowered position;

Figure 6 is a view generally similar to Figure 2 but showing in sectional elevation a modified type of tool lifter system; and Figure 7 is a cross-sectional view taken on the line 7—7 of Figure 6.

As illustrated in Figure 1, the lifter mechanism of the present invention is incorporated in the tool head portion of the machine. In conventional planer construction, a cross rail head 1 is saddled to slide upon a cross rail 2. Since it will be understood that the cross rail transversely surmounts a table and is supported upon side frames or housings for movement toward or from the table by elevating screw means, such parts are not illustrated in the drawings. A slide or so-called harp 3 is swiveled on the cross rail head 2 and carries a slide block 4 which is movable toward or from the table independently of the cross rail by means of a slide screw 5. At its lower end slide block 4 has a tool or clapper box 6 which is swiveled at the lower face thereof, and at its lower portion, the clapper box comprises side walls 7, 7 which reside in spaced, parallel relation to one another to receive a tool block or apron 8 therebetween. The tool block is pivotally movable in the clapper box about an apron pin 11 which is located near the upper end thereof to permit the tool block 8 to be swung arcuately away from the work on the table or downwardly toward it. These movements occur at each end of each stroke as previously explained.

As best shown in Figure 2, the back face of the tool block 8 is provided with a heavy shoulder portion 12 which is received within a recess 13 on the lower face of the clapper box. The rear face of the shoulder portion 12 thereby comes into abutment with the clapper box during a cutting stroke, while the upper face 14 of the shoulder engages the lower face of the recess 13 thereby relieving the apron pin 11 of the upward thrust exerted on the tool block during cutting, the surfaces 13 and 14 being angled or configurated relative to the axis of swing of the tool block about the apron pin 11 for inter-engagement when the tool block is in lowered position. However, in machines where this additional support is not required, the shoulder and recess may be omitted for abutment of the tool block with the face of the clapper box between the side walls 7 thereof.

Tool block 8 carries suitable means for securing one or more tools 15 thereto. In the arrangement shown, this means comprises straps 16 which straddle the tool beneath clamp nuts 17 threaded onto clamp bolts 18 projecting from the face of the tool block. The clapper box 6 at its upper end carries an arcuate slot centered on the swivel axis of the clapper box with respect to the slide block, and clamp bolts 18 pass through the slot into the slide block. This arrangement permits the clapper box and the tool 15 on the block therein to be angulated relative to the axis of the slide to provide sidewise clearance for the tool during lifting thereof.

Briefly, in accordance with one aspect of the present invention, a lifting system is provided wherein a pneumatic power cylinder is employed to lift a tool from its cutting position, in cooperation with a snubber or brake system for decelerating speed of the tool block as it approaches cutting position, thereby to avoid the jolt which otherwise would occur as the tool block comes to rest in the clapper box. According to another aspect of the invention, power means is employed to accelerate the swing of the tool block toward rest position, which is now permissible because of the deceleration of the tool block by the snubbing means as it approaches rest position. Therefore, the system of the present invention enables tool lifting and tool lowering functions to be accomplished in a fraction of the time heretofore required and thereby reduces appreciably the amount of over-travel of the table at each end of each stroke which otherwise would be required.

In the preferred embodiment of the invention as shown in Figures 2-5, the pin on which the clapper box 6 is swiveled on the slide block 4 indicated generally at 20 (Figure 2). This member has a head 21 which is received within clearance recess 22 at the back face of the slide block. The external shank portion of the pin forms the pivot for the clapper box with respect to the slide, and a counter-turned portion 23 of the pin is threaded into and thereby fixed rigidly upon the slide block. This much of the construction is conventional.

In accordance with the present invention, however, the pin 20 is bored longitudinally as at 24 so that the pin constitutes a cylinder within which pistons 25 and 26 are slidably received for independent movement. Piston 25 is a thrust piston having a forward portion 27 presenting a crowned end 28 of reduced diameter which is engageable with a thrust face 29 provided at the rearward side of the tool block 8. In the preferred construction, the thrust face is the bottom surface of a relatively shallow recess or hardened insert therein which is of sufficient diameter to clear the forward portion 27 of the piston 25, and to reduce wear the face is preferably angulated so as to reside in a plane normal to the axis of movement of the piston 25 when the tool block is in a partially elevated position. Thus, as the tool block swings upwardly under thrust from piston 25, the face 29 rolls relative to the crowned forward face 28 of the piston. The piston 25 is grooved as at 30 to receive a sealing or O-ring 31 and a rearward portion of the piston 25 has a portion 32 of reduced diameter.

Piston 25 at respectively opposite points on its circumference contains paired slots 33 which are respectively engaged by pins 34 extending transversely of the piston from the head 21 of the swivel pin 20 in which the pins are securely fastened. The slots are of varying length, whereby abutment of the ends of the slots with the pins selectively limits the forward stroke of piston 25 and thereby determines the amount of lift imparted to the tool block. Normally, when the tool block is in lowered position, the pins remain engaged in the forward ends of the slots, but the degree of lift readily may be varied by raising the tool block manually, pushing piston 25 rearwardly until the pins clear the slots, then rotating the piston to bring it into engagement with the pins, the pair of slots corresponding to the degree of lift desired.

The second piston 26 in the bore 24 of the swivel pin is a short floating piston having a compression ring 35. Intermediate pistons 25 and 26 is a stop ring 36 which projects annularly inwardly from the internal circumference of the piston bore 24 to limit movement of piston 26 in the forward direction. Ring 36 also has a bore through it which slightly clears the portion 32 of reduced diameter at the rear end of piston 25, thereby allowing the rear end of piston 25 to come into abutting engagement with the forward face of piston 26 during rearward movement of the former.

Air under operating pressure sufficient to provide a rapid lifting movement of the tool block through the forward thrust of piston 25 thereon is supplied to the cylinder through a line 37 which enters at a point behind cylinder 25 but just ahead of the stop ring 34.

An hydraulic snubber system operates in conjunction with the pneumatic tool lift which has just been explained to decelerate or brake the descent of the tool block toward the clapper box. This system is illustrated diagrammatically in Figures 4 and 5; the mechanical adaptation thereof facilitating incorporation of the system into the machine as shown in Figure 2 is subsequenlty explained.

The snubber system comprises a cylinder 38 having a piston 39 therein which presents a larger surface at its one end than the other. The large area end of the piston is subjected to air pressure through a line 40 which communicates with the air line 37 leading to the cylinder 24. The small area end of the piston communicates with the rear end of short piston 26 through a duct 41 which includes a check valve 42 opening toward the cylinder 24 and a metering valve 43 which is installed in a bypass 44 around the check valve 42. That portion of the system which includes the space between the rear end of piston 26 and the adjacent end of its cylinder, the duct 41 and the valving therein, as well as the space between the small diameter of piston 39 and the adjacent end of cylinder 38, is filled with oil which is free to flow from one cylinder to the other through the duct 41 under the influence of piston 26 or 39 except as governed by the check and metering valves.

It is to be noted that piston 39 in cylinder 38 is grooved at its endwise portions to receive seal rings 46. It is also to be noted that when air is admitted to line 37, air is admitted simultaneously under the same pressure through line 40 to the upper end of cylinder 38. The pistons 26 and 39 are thereby counterbalanced except that the area of the piston 39 which is subjected to air pressure, being greater than the area of piston 26 which is subjected to the same air pressure (for example by approximately 30%), enables piston 39 to expel oil from the cylinder 38 past the open check valve and into the cylinder 24 until piston 26 comes to rest against the stop ring 36. The floating piston 26 thereby follows the thrust piston 25.

Air lines 37 and 40 are controlled in common from a solenoid valve 48 which, in turn, receives air from a supply line 49. The solenoid is controlled in any suitable manner by switch or mechanical means responsive to movement of the table of the machine. For example, one means is illustrated diagrammatically by switch 50 having an actuating arm 51 which is engaged by dogs 52 positioned on the table of the machine at opposite ends thereof to trip the switch and thereby open and close the valve at the respective ends of the table stroke. In the alternative, the control for the valve 48 may be included as a part of the drive system for moving the table back and forth or in other suitable manner.

The operation of the lift and snubber system just described is as follows: When the tool block is in its lowered position, which it occupied during a cutting stroke, pistons 25 and 26 are in the position shown in Figure 5, that is, the piston 25 is in abutment with the piston 26 and the hydraulic fluid has been caused to flow into cylinder 38 where it constitutes a reservoir supply. Immediately at the end of the cutting stroke, valve 48 is opened, for instance by engagement of one of the dogs with switch arm 51 to energize the solenoid of the valve, and air under pressure is admitted to line 37, entering cylinder 24 beyond the rear face of the piston 25 therein. Air simultaneously enters cylinder 38 through line 40. The air pressure in cylinder 24 immediately thrusts piston 25 against the tool block and raises the tool to an elevated position above the work. Simultaneously, air pressure exerted at the head end of piston 39 causes it to drive oil past the check valve 42 into the cylinder 24, moving the piston 26 therein in a forward direction until it comes to rest against the stop ring 36.

During this sequence of events, the table reversing mechanism of the machine has also caused the table to be driven in the return direction. As soon as the end of the work on the table has been carried past the cutting tool, valve 48 is automatically shut off, opening lines 37 and 40 to atmosphere through the exhaust port (not shown) of the valve. As pressure in cylinder 24 subsides, the tool block, bearing against the crowned face of the piston 25 under gravity or mechanical bias as subsequently explained, causes piston 25 to move inwardly. During this movement, the rear face of piston 25 comes into engagement with piston 26 and urges the piston in the rearward direction, causing hydraulic fluid to be expelled from piston 24. However, such flow through duct 41 is checked by ball valving 42, and the fluid can escape from cylinder 24 only at a rate governed by the setting of the metering valve 43.

The parts are adjusted to restrict the flow of fluid at a time just before the tool block comes into abutment with the clapper box; for instance, the parts may be adjusted for snubbing action to commence when the tool block is approximately 1/16 to 1/8 of an inch away from its abutment position. This permits the tool block to move rapidly during the major portion of its descent from lift position. However, once snubbing action commences, the tool block is rapidly decelerated or braked. At the commencement of the braking operation, that is, in the momentary period before the ball valve is seated, a rush of fluid occurs through its port, but this flow diminishes rapidly as the ball is carried to the closed position by the flow of fluid and thereafter flow occurs only through the by-pass. In this manner the tool block, although heavy and returned at high speed, comes to rest in a gentle manner.

In the mechanical adaptation of the principles illustrated in Figures 4 and 5, cylinder 38 is in the form of a cylinder block fastened to a side face of the slide block. Air in line 40 is admitted through a flexible hose connection as at 55 while hydraulic fluid at the other end communicates with cylinder 24 through a combined check and metering valve 56 which is commonly available for installation in a hose connection such as line 57. Such a valve, for example, is manufactured by Hanna Valve Company and is sold under their number 19799–A. The valve comprises a ring knurled at its circumference which is rotatable to vary the metering rate but also includes a ball check valve which opens under flow of hydraulic fluid toward cylinder 24. Since this valve is conventional and its function has been explained, its internal details are not illustrated.

The lower end of hose connection 57 beyond valve 56 is connected to an elbow 54 mounted on the side wall of the slide block which communicates with a hole 58 drilled transversely into the slide block to a point above the swivel pin 20. From here a cross hole 59 is drilled into the block for communication with holes 60 in a head piece 61 which fits over the inner end of pin 20 and the open end of the bore 24 therein. The head 61 is secured to the back face of the slide block by fastening bolts 62, and pressure-tight connection is maintained by means of an O-ring 63 installed between the head 61 and the rear end projection of pin 20.

Air is supplied to cylinder 24 through a port hole 37 which may enter the cylinder 24 through the slide block, at the outer face of which a hose fitting is provided. The main air control valve may be installed at any suitable point on the machine.

Even though the tool block and tools thereon is a heavy unit, its fall by gravity alone momentarily following air cut off may be slow at the start; partly this may be due to the snug fit of the tool block on the apron pin between the side walls of the clapper box and partly it may be due to the viscosity of the oil which is used to lubricate these parts. In the preferred construction of this invention, return of the tool block to cutting position more promptly than is accomplished by gravity alone may be obtained by a torsion spring 66 which is wound around the apron pin 11 and has one end fixed to the clapper box while the opposite end engages the tool block to urge it in the lowering direction. The spring, therefore, is tensioned, or "wound up" in each lifting movement of the tool block, and drives the tool block promptly and immediately in the opposite direction as soon as the lift piston allows the tool block to return. In addition to the rapidity of lowering which this arrangement provides, the spring furnishes a cushioning effect as the tool block approaches its raised position in that as the tool block is lifted, the resistance of the spring becomes greater, thereby exerting a decelerating effect on the tool block as it approaches its upper position. Since the spring is most relaxed, or may be completely relaxed, when the tool block is in cutting position, the spring does not impede rapid tool block movement at the start of lifting.

In the specific construction shown in Figures 2 and 3, the spring 66 has an actuating arm portion 67 which traverses a slot 68 in a bracket 69 extending sidewisely from the tool block, as at 70. The upper portion of the spring 66 is wound convolutely about a bushing 72 which is fixed to the clapper box by bolts 73. A laterally bent portion of the spring is secured to a tensioning ring 74 which is fastened upon a tapered portion 75 of the apron pin 11, a nut 76 being threaded on the projecting endwise portion of the apron pin to drive ring 74 into non-rotative engagement therewith. Bushing 72, in turn, is keyed to the apron pin 11 by key member 77. Upon release of the lock nut 76, the introduction of a pin or spanner wrench into one or more holes 78 provided in the circumference of the tensioning ring 74 permits the tensioning ring to be rotated in one direction or the other, thereby to adjust the force which the spring exerts upon the tool block.

In Figures 6 and 7, a modified system is shown wherein air under pressure is employed to effect both rapid lifting and rapid return of the tool block in conjunction with a snubbing action to prevent jolting as the block is seated in the clapper box. In this construction a crank arm 80 is keyed to the apron pin 11 as at 81, and the tool block, here designated 82 (Figure 7), is also keyed to the apron pin 11 as at 83. Therefore, the crank arm 80 and tool block swing in unison about the axis of the apron pin bearings 84 in the side walls of the clapper box.

A piston rod 85 is pivoted to the crank arm 80 by means of a wrist pin 86, and the piston rod 85 carries a piston 87 which is slidable in a cylinder 88 pivoted at its lower end to the lower end of the clapper box side wall as at 89. Cylinder head 90, bored to slidably receive the piston rod 85, is threaded to the rod end of the cylinder 88, while the opposite end of the cylinder is closed by end wall 91. Piston rod 85 traverses a floating piston 92 which is installed in the cylinder 88 intermediate the rod end of the piston 87 and the cylinder head 90.

Cylinder 88 is provided with two ports 93 and 94. These pass through the side wall of the cylinder, the first at a point below floating piston 92 but above the piston 87 when it is at its upper limit of travel, and the second at a point between the lower end of the cylinder and piston 87 when it is at its lower limit of travel. An air line 95 is connected to the cylinder at port 93, and an air line 96 is connected to the cylinder at port 94. The air lines may be in the form of flexible hoses to permit movement thereof sufficient to accommodate the small arcuate movement of the cylinder 88 which is incidental to the raising and lowering of the tool block.

Air under pressure is supplied alternately to air lines 95 and 96 from a directional control valve, which is not repeated in Figure 6 but which may be like valve 48 previously described, positioned on the machine for automatic actuation when the table reaches the ends of its cutting and return strokes. The valve preferably is such that when air is admitted to one of the lines 95 or 96 through the valve, the other line is open to exhaust through the valve.

From this construction, it will be seen that admission of air under pressure through line 95 causes the piston 87 to move downwardly in the cylinder from the position in which it is shown in Figure 6. This movement causes the crank arm 80 to swing in clockwise direction, thereby rotating the apron pin 11 to lift the tool block which is keyed to the apron pin. In this movement, air in the lower portion of the cylinder is exhausted through line 96.

The tool block remains in lifted position throughout the ensuing return stroke of the table, at the end of which the control valve is shifted automatically to admit air through line 96 and open line 95 to exhaust. Admission of air under pressure to the cylinder 88 through line 96 causes the piston to be thrust upwardly, thereby swinging crank arm 80 in counter-clockwise direction to lower the tool block rapidly.

To provide snubbing action in this construction, the piston 87 at the rod end thereof has a boss 97 which is adapted to extend through the bore of a stop ring mounted in the cylinder 88 beneath the floating piston 92 thereof. In addition, the cylinder head 90, at the other side of the floating piston 92, is provided with a port 98 to which a flexible line 100 is connected which leads to a snubber cylinder and piston assembly conforming in function and construction to the assembly 38, 39 shown in Figure 4, previously described. Similarly, the check and metering valves may be installed in the line 100 between the cylinder head 90 and the snubber cylinder either as a Hanna valve unit or as a built-in part of the equipment. As also previously described, air pressure is supplied to the head or air end of the piston in the snubber cylinder while the entire system between the opposite end of the snubber piston and the floating piston is filled with hydraulic fluid.

Thus, as the tool block descends toward cutting position, the boss 97 on piston 87 engages floating piston 92 which has previously been driven into engagement with the stop ring 101 by reason of the air pressure on the piston of the snubber cylinder which forced hydraulic fluid therefrom through line 100 past the check valve therein. Further upward movement of the piston 87 causes the floating piston 92 to be moved therewith, expelling hydraulic fluid from the head end of the cylinder 88 through line 100. This expulsion of fluid causes the check valve in line 100 to close, but flow of fluid to the snubber is permitted at a slow rate through the metering valve in line 100. It will be understood that this action occurs in the last phase of movement of the tool block to cutting position, that is, in the momentary period before the tool block seats in the clapper box. The rate of deceleration of the tool block is very rapid but the cushioning effect provided by the snubber system prevents the tool block from subjecting the clapper box and associated parts of the machine to a heavy jolt which would otherwise occur if the heavy tool block and tool thereon hit the clapper box at the high rate of speed during the main portion of the power stroke of the piston in the block-lowering operation. The deceleration also effectively prevents bouncing of the tool block in the clapper box which would otherwise occur. In this manner air under pressure is employed to effect power return of the tool block to cutting position as an alternative to the power return provided by the spring described in the previous embodiment.

For compaction of the apparatus if desired, the snubber cylinder may be built into the apron pin 11 as a bore thereof adapted to receive the snubber piston, in which event line 100 may be connected to one end of the bore in the apron pin while the air supply therefor may be connected to the other end.

Tools mounted on the tool block may be inspected most conveniently while the tool block is in the lift position, and it is also frequently desirable to raise the tool block independently of the automatic system just described in order to facilitate cleaning of the machine. If it is desired to raise the tool block for inspection at any time while the tool block is in cutting position, the machine is merely operated to cause the table to move to the end of its cutting stroke, at which time the tool block will raise automatically and remain raised until the table is moved through return stroke.

Having described my invention, I claim:

1. In a machine tool of the planer type having a tool block pivotally mounted in a clapper box for swinging movement between cutting and lift positions and engageable with an abutment in its cutting position, an air-operated power cylinder mounted in said clapper box behind said tool block, a power piston slidable in said cylinder, said piston having a forward end engaging the tool block for swinging the same from the cutting position to the lift position, a spring interconnecting the tool block and clapper box and normally biasing the tool block toward cutting position and into engagement with said abutment, means for applying and exhausting air pressure relative to said cylinder for reciprocating said piston and tool block between its cutting and lift positions, whereby said spring decelerates the motion of the tool block during motion to the lift position and drives the tool block from the lift position back to the cutting position into engagement with said abutment, a floating piston slidably mounted within said power cylinder adjacent the rearward end thereof, a hydraulic snubber apparatus in communication with the rearward end of said power cylinder and acting upon the said floating piston, said power piston engaging said floating piston as said tool block approaches the cutting position, said floating piston thereupon exhausting hydraulic fluid from the power cylinder to the snubber apparatus at a metered rate and decelerating the power piston and tool block as the block approaches said abutment.

2. In a machine tool of the planer type having a tool block pivotally mounted in a clapper box for swinging movement between cutting and lift positions and engageable with an abutment in its cutting position, an air-operated power cylinder mounted in said clapper box behind said tool block, a power piston slidable in said cylinder, said piston having a forward end engaging the tool block for swinging the same from the cutting position to the lift position, a spring interconnecting the tool block and clapper box and normally biasing the tool block toward cutting position and into engagement with said abutment, air supply means for applying and exhausting air pressure relative to said cylinder for reciprocating said piston and tool block between its cutting and lift positions, whereby said spring means decelerates the motion of the tool block during motion to the lift position and drives the tool block from the lift position back to the cutting position into engagement with said abutment, a floating piston slidably mounted within said power cylinder adjacent the rearward end thereof, a hydraulic snubber cylinder having an end communicating with the rearward end of the power cylinder, a snubber piston slidably confined in said snubber cylinder, and yieldable means acting upon the snubber piston in a direction to normally urge the floating piston hydraulically toward the power piston, said power piston being engageable with the floating piston during motion of the tool block toward cutting position, thereby forcing the floating piston in a direction to discharge hydraulic fluid from the power cylinder to the snubber cylinder for decelerating the tool block prior to engagement thereof with said abutment.

3. In a machine tool of the planer type having a tool block pivotally mounted in a clapper box for swinging movement between cutting and lift positions and engageable with an abutment in its cutting position, an air-operated power cylinder mounted in said clapper box behind said tool block, a power piston slidable in said cylinder, said piston having a forward end engaging the tool block for swinging the same from the cutting position to the lift position, a spring interconnecting the tool block and clapper box and normally biasing the tool block toward cutting position and into engagement with said abutment, air supply means for applying and exhausting air pressure relative to said cylinder for reciprocating said piston and tool block between its cutting and lift positions, whereby said spring means decelerates the motion of the tool block during motion to the lift position and drives the tool block from the lift position back to the cutting position into engagement with said abutment, a floating piston slidably mounted within said power cylinder adjacent the rearward end thereof, a hydraulic snubber cylinder, a snubber piston slidably confined in said cylinder, conduit means connecting the ends of said cylinders, whereby force imparted to the floating piston reacts hydraulically upon the snubber piston through said conduit means, said air supply means communicating with the snubber cylinder and acting upon the snubber piston in a direction to normally urge the floating piston hydraulically toward the power piston upon application of air pressure to the power cylinder, said power piston being engageable with the floating piston during motion of the tool block toward cutting position when said air pressure is exhausted, thereby forcing the floating piston in a direction to discharge hydraulic fluid to the snubber cylinder for decelerating the tool block prior to engagement thereof with said abutment.

4. In a machine tool of the planer type having a tool block pivotally mounted in a clapper box for swinging movement between cutting and lift positions and engageable with an abutment in its cutting position, an air-operated power cylinder mounted relative to said clapper box, a power piston slidable in said cylinder, a floating piston mounted in said cylinder, one end of the power piston being engageable with the tool block, the opposite end of said power piston being engageable with said floating piston, said power piston adapted to swing the tool block from the cutting position to the lift position, spring means normally biasing the tool block toward cutting position and into engagement with said abutment, means for applying and exhausting air pressure relative to said power cylinder for reciprocating said power piston and tool block between its cutting and lift positions, whereby said spring means decelerates the tool block during its motion toward the lift position and drives the tool block from the lift position back to the cutting position and into engagement with said abutment, a hydraulic snubber apparatus in communication with said power cylinder and acting upon said floating piston, said power piston engaging said floating piston as said tool block approaches the cutting position, said floating piston thereupon exhausting hydraulic fluid from the power cylinder to the snubber apparatus at a metered rate and decelerating the power piston and tool block as the block approaches said abutment.

5. In a machine tool of the planer type having a tool block pivotally mounted in a clapper box for swinging movement between cutting and lift positions and engageable with an abutment in its cutting position, an air-operated power cylinder mounted relative to said clapper box behind said tool block, a power piston slidable in said cylinder, a floating piston mounted in said cylinder, one end of the power piston being engageable with the tool block, the opposite end of said power piston being engageable with said floating piston, said power piston adapted to swing the tool block from the cutting position to the lift position, spring means normally biasing the tool block toward cutting position and into engagement with said abutment, means for applying and exhausting air pressure relative to said power cylinder for reciprocating said power piston and tool block between its cutting and lift positions, whereby said spring means decelerates the tool block during its motion toward the lift position and drives the tool block from the lift position back to the cutting position and into engagement with said abutment, hydraulic snubber apparatus in communication with the power cylinder and acting upon the floating piston, said air supply and exhaust means communicating with the snubber apparatus in a direction to normally urge the floating piston hydraulically toward the power piston upon application of air pressure to the power cylinder, and stop means for limiting movement of the snubber piston toward said power piston, said stop means adapting the power piston to move to a point beyond the floating piston in a tool elevating direction, said power piston being engagable with the floating piston during motion of the tool block toward cutting position when said air pressure is exhausted, thereby forcing the floating piston in a direction to discharge hydraulic fluid to the snubber apparatus for decelerating the tool block prior to engagement thereof with said abutment.

6. In a machine tool of the planer type having a tool block pivotally mounted in a clapper box for swinging movement between cutting and lift positions and engageable with an abutment in its cutting position, an air-operated power cylinder mounted relative to said tool block, a first piston slidable in said cylinder and responsive to movement of the tool block toward said abutment, a second piston freely movable in said cylinder, one end of the power piston being engageable with the clapper box, said second piston being movable in response to movement of the first piston upon motion of the tool block toward the cutting position, said first piston adapted to swing the tool block from the cutting position to the lift position, a spring interconnecting the tool block and clapper box and normally biasing the tool block toward cutting position and into engagement with said abutment, valve means for applying and exhausting air pressure relative to said power cylinder for reciprocating said first piston and tool block between its cutting and lift positions, whereby said spring means decelerates the tool block during its motion toward the lift position and drives the tool block from the lift position back to the cutting position and into engagement with said abutment, a snubbing cylinder in communication with the power cylinder, a third piston in said snubbing cylinder, one side of said third piston being responsive to the fluid pressure developed in said power cylinder by movement of said first and second said pistons in consequence of tool block motion toward said lift position, said first piston being engageable with the second piston during motion of the tool block toward cutting position when said air pressure is exhausted, thereby forcing the second piston in a direction to discharge hydraulic fluid to the snubber cylinder for decelerating the tool block prior to engagement thereof with said abutment.

References Cited in the file of this patent

UNITED STATES PATENTS

| | | |
|---|---|---|
| 1,266,486 | Kleinegris | May 14, 1918 |
| 1,998,873 | Kingsbury | Apr. 23, 1935 |
| 2,387,012 | Daugherty | Oct. 16, 1945 |
| 2,388,547 | Johnson | Nov. 6, 1945 |
| 2,530,343 | Walter | Nov. 14, 1950 |
| 2,533,680 | Morey | Dec. 12, 1950 |